United States Patent
Sekita et al.

(10) Patent No.: US 9,157,005 B2
(45) Date of Patent: Oct. 13, 2015

(54) SEALING MATERIAL AND METHOD OF FOAMING APPLICATION THEREOF

(71) Applicant: Nitta Gelatin Inc., Osaka (JP)

(72) Inventors: Kazuyoshi Sekita, Osaka (JP); Hiroyuki Nakatani, Osaka (JP); Seiki Ueno, Osaka (JP)

(73) Assignee: NITTA GELATIN INC., Osaka (JP)

( * ) Notice: Subject to any disclaimer, the term of this patent is extended or adjusted under 35 U.S.C. 154(b) by 46 days.

(21) Appl. No.: 14/155,727

(22) Filed: Jan. 15, 2014

(65) Prior Publication Data

US 2014/0127421 A1    May 8, 2014

Related U.S. Application Data

(62) Division of application No. 13/119,263, filed as application No. PCT/JP2008/071180 on Nov. 14, 2008, now abandoned.

(51) Int. Cl.
| | |
|---|---|
| *C09D 133/08* | (2006.01) |
| *B29D 99/00* | (2010.01) |
| *C04B 41/00* | (2006.01) |
| *C04B 41/48* | (2006.01) |

(Continued)

(52) U.S. Cl.
CPC .......... *C09D 133/08* (2013.01); *B29D 99/0053* (2013.01); *C04B 41/009* (2013.01); *C04B 41/483* (2013.01); *C04B 41/63* (2013.01); *C08J 9/122* (2013.01); *C09K 3/10* (2013.01); *C08J 2201/026* (2013.01); *C08J 2203/06* (2013.01); *C08J 2333/06* (2013.01); *C09K 2003/1062* (2013.01); *C09K 2200/0625* (2013.01)

(58) Field of Classification Search
CPC ...................................... C08J 9/22; C09K 3/10
See application file for complete search history.

(56) References Cited

U.S. PATENT DOCUMENTS

| | | |
|---|---|---|
| 5,026,806 A | 6/1991 | Rehmer et al. |
| 6,358,580 B1 | 3/2002 | Mang et al. |
| 2007/0023946 A1* | 2/2007 | Navez et al. ................. 264/45.9 |

FOREIGN PATENT DOCUMENTS

| | | |
|---|---|---|
| CN | 1095742 | 11/1994 |
| CN | 1289359 | 3/2001 |

(Continued)

OTHER PUBLICATIONS

Foam Extrusion Principles and Practice Edited by S .-T . Lee CRC Press 2000 Print ISBN: 978-1-56676-879-5 eBook ISBN: 978-01-4200-1412-9.*

(Continued)

*Primary Examiner* — Randy Gulakowski
*Assistant Examiner* — Christina Wales
(74) *Attorney, Agent, or Firm* — Roylance, Abrams, Berdo & Goodman, L.L.P.

(57) ABSTRACT

The method of foaming and applying a sealing material is characterized by comprising the steps of hot-melting the sealing material; mixing nitrogen gas into the melted sealing material under a predefined pressurization; discharging the resultant mixture at a predefined pressure into the air to thus foam the mixture and simultaneously apply it to a place necessary to seal, thus making a sealing foam; and curing this sealing foam by ultraviolet rays. By this method, the sealing material does not involve flowing after applied, and shows an excellent sealing performance even under severe heat resistance conditions, and also can make good independent cells inside even when used in a foamed condition.

4 Claims, 1 Drawing Sheet

(51) Int. Cl.
*C04B 41/63* (2006.01)
*C08J 9/12* (2006.01)
*C09K 3/10* (2006.01)

(56) References Cited

FOREIGN PATENT DOCUMENTS

| | | |
|---|---|---|
| EP | 0367054 | 5/1990 |
| EP | 0612812 | 8/1994 |
| JP | 01-190781 | 7/1989 |
| JP | 02-170884 | 7/1990 |
| JP | 06-192468 | 7/1994 |
| JP | 07-033991 | 2/1995 |
| JP | 07-062228 | 3/1995 |
| JP | 09-040870 | 2/1997 |
| JP | 11-293020 | 10/1999 |
| JP | 2004-269678 | 9/2004 |
| JP | 2006-328382 | 12/2006 |
| JP | 2008056821 A * | 3/2008 |

OTHER PUBLICATIONS

Translation of Table 1 from JP 2008056821 by Suzuki et al.*
Extended European Search Report dated Sep. 3, 2012, from the European Patent Office in corresponding European Application No. 08878139.8.
Communication dated Sep. 28, 2012, from the Chinese Patent Office in corresponding Chinese Application No. 200880131737.X.
Translation of Table 1 from JP 2008056821; Mar. 2008.

* cited by examiner

SEALING MATERIAL AND METHOD OF FOAMING APPLICATION THEREOF

TECHNICAL FIELD

The present invention relates to a sealing material and a method of foaming application thereof. In detail, the invention relates to: a sealing material which is hot-melting and ultraviolet-curable and is favorably used particularly as a foamable one; and a method of foaming application of the sealing material.

BACKGROUND ART

As known examples of sealing materials, the following examples can be cited. However, all of them have the following problems.

Known is a gasket-composite material utilizing a resin composition obtained by pressure-injecting an inert gas into a composition comprising an ethylenically unsaturated compound and a near-infrared photopolymerization initiator to thus foam the composition into the form of a shake (refer to patent document 1 below). However, since the aforementioned composition is liquid, the composition cannot be left applied, so that there is worry that before curing, the composition might flow or result in foam breakage.

As a foamed and cured material usable as a foamed gasket material, there is known a technic in which a predefined foamable polysiloxane composition is used and is irradiated with ultraviolet rays at the same time as being applied, so that the foaming and the curing are caused at the same time (refer to patent document 2 below). However, if the ultraviolet irradiation is not uniform when the aforementioned composition is used, then there is a problem that the foam density or foamed condition is not stable, and further, since the aforementioned composition is liquid, the composition cannot be left applied, so that there is worry that the composition might flow before curing, and that as result, the foaming and curing are caused in the flowed condition.

Also known is a photo-reactive sealing material comprising a photo-reactive composition (refer to patent document 3 below). However, in this technic, similarly to the above-mentioned technics, since the composition is liquid, the composition cannot be left applied, so that there is worry that the composition might flow before curing.

Also known is a foaming-type sealing composition comprising a rubbery organic polymer having at least one reactive silicon group, a silanol condensation catalyst for curing this polymer, and an organic pyrolyzing type foaming agent (refer to patent document 4 below). However, in this technic, similarly to the above-mentioned technics, since the composition is liquid, the composition cannot be left applied, so that there is worry that the composition might flow before curing. In addition, there must be thermosetting facilities in a line in order to carry out foaming by utilizing the thermosetting or pyrolyzability, so that the line constitution is limited.

The above-mentioned technics are common with each other in respect to having the problem of flowing before curing of the composition. In addition, these sealing materials having high flowability have a further problem that when being foamed, they involve foam breakage, so that cells in the inside of the sealing materials become continuous cells, thus resulting in degradation of such as heat resistance, air tightness and water tightness. As a sealing material which little involves such problems of flowing and foam breakage, hot-melt sealing materials are known.

For example, as a hot-melt sealing material, there is known a lap joint type pre-sealing material comprising a mixture of such as a thermoplastic elastomer, a tackifier resin and a wax (refer to patent document 5 below). However, the aforementioned thermoplastic elastomer does not have any crosslinked structure, so that when exposed to heat resistance, the sealing material might melt out.

Therefore, there is also known a technic in which in order to make up for the heat resistance inferiority of the aforementioned hot-melt type sealing material, moisture curing or ultraviolet curing is used together with cooling solidification of the hot-melt type sealing material.

For example, there is known a reactive type hot-melt composition which comprises a predefined urethane prepolymer and a predefined copolymer and further comprises a predefined thermoplastic elastomer in order to prevent foaming during the curing (refer to patent document 6 below). In this technic, the moisture curing is applied as the aforementioned curing reaction. However, in this technic, there is worry: during the hot-melting, gelation might occur, or an unreacted component of a diisocyanate compound which is used as a raw material for the urethane polymer might be discharged into the air, and besides, there is also worry that a difference in the adhesive property might be made due to the difference in temperature or humidity between winter and summer. In addition, in cases where the moisture in the air is completely shut down in order to enhance the heating stability, such cases result in the use under high pressure and are therefore unfavorable in respect to the safety.

In addition, there is known a ultraviolet-curable hot-melt sealing material which comprises a predefined ultraviolet-curable component, a predefined tackifier resin and a predefined thermoplastic elastomer and is provided with an ultraviolet polymerization initiator (refer to patent document 7 below). According to this technic, the sealing material which is excellent also in heat resistance is assumed to be obtained. However, the heat resistance as referred to therein is on the assumption of a condition of about 80° C. Therefore, if this sealing material is left under severer heat resistance conditions (e.g. not lower than 100° C.) after cured, then the adhesion performance and the compression-set become worse, so that the degradation of the sealing performance is unavoidable.

[Patent Document 1]
JP-A-06-192468
[Patent Document 2]
JP-A-09-040870
[Patent Document 3]
JP-A-2004-269678
[Patent Document 4]
JP-A-11-293020
[Patent Document 5]
JP-A-01-190781
[Patent Document 6]
JP-A-07-062228
[Patent Document 7]
JP-A-2006-328382

DISCLOSURE OF THE INVENTION

Objective Problems that the Invention is to Solve

Therefore, objective problems that the present invention is to solve are: to provide a sealing material which does not involve flowing after applied, and shows an excellent sealing performance even under severe heat resistance conditions, and also can make good independent cells inside even when used in a foamed condition; and to provide a method of foaming application of the sealing material.

Means of Solving the Objective Problems

The present inventors diligently studied to solve the above objective problems.

In its course, first of all, in order to obtain the sealing material which does not involve flowing, the present inventors directed their attention to the aforementioned hot-melting and ultraviolet-curable sealing material as disclosed in patent document 7 above. However, they have noticed that: in this technic, the thermoplastic elastomer is not ultraviolet-curable and therefore its thermoplastic property remains even after applying of the sealing material, so that the heat resistance of the sealing material becomes worse. Therefore, they have studied whether the amount of the thermoplastic elastomer which is not ultraviolet-curable and causes the inferiority of the heat resistance can be reduced in order to more enhance the heat resistance.

As a result, they have found out that an acrylate having a glass transition temperature of −70 to 0° C. after ultraviolet curing can provide a sealing material with softness and a hot-melting property (i.e. a property to melt by heating and to solidify by cooling), so that this acrylate having a glass transition temperature of −70 to 0° C. after ultraviolet curing can be used as a substitute component for the thermoplastic elastomer. However, they have also found out that the acrylate having a glass transition temperature of −70 to 0° C. after ultraviolet curing needs to have a weight-average molecular weight of 500 to 50,000, and further that the sealing material needs to have a melt-viscosity at 120° C. of 1,000 to 50,000 mPa·s. In addition, they have also found out that since the aforementioned acrylate is curable by ultraviolet rays, high heat resistance can be ensured, so that there does also not occur the problem of the heat resistance degradation caused in the case of using the thermoplastic elastomer which is not ultraviolet-curable. In addition, they have also found out that the aforementioned sealing material also can make good independent cells even when used for foamable sealing, and therefore, does not only have high heat resistance, but also has excellent sealing performance such as air tightness and water tightness.

Furthermore, they have also found out applying conditions favorable for well forming independent cells when applying the above-mentioned sealing material in a foamed condition.

The present invention has been completed by the above-mentioned findings and their confirmation.

That is to say, a sealing material according to the present invention is characterized by comprising an ultraviolet-curable component and an ultraviolet polymerization initiator, wherein in cases where the sealing material further comprises a thermoplastic elastomer which is not ultraviolet-curable, its content is not higher than 5 weight % based on the total amount of the resin components, and wherein the sealing material comprises an acrylate as the ultraviolet-curable component in a ratio of not less than 50 weight % based on the total amount of the resin components wherein the acrylate has a weight-average molecular weight of 500 to 50,000 and has a glass transition temperature of −70 to 0° C. after ultraviolet curing, and wherein the sealing material has a melt-viscosity at 120° C. of 1,000 to 50,000 mPa·s.

In addition, a method according to the present invention of foaming application of a sealing material comprises the steps of: hot-melting the sealing material; mixing a pressurized inert gas into the melted sealing material; discharging the melted sealing material containing the pressurized inert gas into the air to thus foam the sealing material and simultaneously apply it to a place necessary to seal, thus making a sealing foam; and irradiating this sealing foam with ultraviolet rays, thus curing the sealing material; wherein the method is characterized in that: the mixing of the inert gas is carried out by: using nitrogen gas as the inert gas; pressurizing the nitrogen gas into a pressure of 0.01 to 0.1 MPa; and blowing the pressurized nitrogen gas into the sealing material; and the applying of the sealing material is carried out at a discharging pressure of 2.7 to 9.7 MPa.

Effects of the Invention

By using the specific acrylate, the sealing material according to the present invention can be provided with the softness and the hot-melting property without using any thermoplastic elastomer which is not ultraviolet-curable, and can be prevented from flowing due to fast cooling solidification based on the hot-melting property, and also can be enhanced in respect to the heat resistance due to the reduction of the amount of the aforementioned thermoplastic elastomer which is not ultraviolet-curable being used. The aforementioned sealing material according to the present invention can be used both for non-foamable sealing and for foamable sealing, but can make good independent cells inside while little involving the foam breakage even when used for foamable sealing, and therefore, does not only have high heat resistance, but also has excellent sealing performance such as air tightness and water tightness. Since the ultraviolet-curable component can be cured in a short time, the independent cells can be ensured even at a comparatively low viscosity.

In addition, since the method according to the present invention of foaming application of a sealing material uses the best applying conditions when applying the sealing material in a foamed condition, this method can particularly well form independent cells.

BRIEF DESCRIPTION OF THE DRAWINGS

In FIGS. 1 to 3, symbol 10 represents a construction exterior panel, symbols 12 and 14 represent sealing surfaces, symbol 20 represents a sealing material, symbol 30 represents a discharging nozzle, and symbol 40 represents an ultraviolet lamp.

BEST MODE FOR CARRYING OUT THE INVENTION

Figure 1:
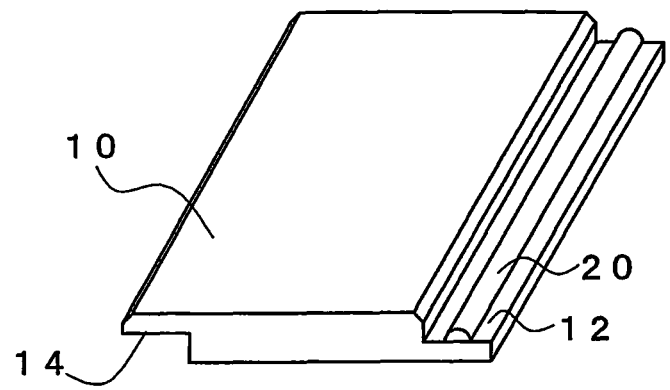
FIG. 1 is a perspective view of a seal-treated construction exterior panel which illustrates an embodiment of the present invention.

Hereinafter, detailed descriptions are given about the sealing material and method of foaming application thereof according to the present invention. However, the scope of the present invention is not bound to these descriptions. And other than the following illustrations can also be carried out in the form of appropriate modifications of the following illustrations within the scope not departing from the spirit of the present invention.

[Sealing Material]:

The sealing material according to the present invention cannot only be used for non-foamable sealing, but also can be used for foamable sealing.

It is known that conventional sealing materials are classified into hot-melting (hot-melt type) sealing materials, moisture-curable sealing materials, and ultraviolet-curable sealing materials, according to differences in curing mechanism for curing the sealing material after having formed a sealing matter by applying the sealing material to a place needing to be sealed. Among these sealing materials, the sealing material according to the present invention is a hot-melting and ultraviolet-curable sealing material.

The sealing material according to the present invention is used in a melted condition resultant from hot-melting. The curing, after having formed the sealing matter by applying (discharging) the melting-conditioned sealing material, is carried out in combination of both mechanisms of the cooling solidification and the ultraviolet curing. Usually, the basic shape or structure of the sealing matter is determined by cooling, and thereafter the ultraviolet curing proceeds in the inside of the sealing matter.

The sealing material according to the present invention is usually applied to a sealing treatment in which the sealing foam is formed by foaming the sealing material during its use.

As is hereinafter specifically described as a composition formulation of a sealing material suitable for such a curing mechanism or use form, the sealing material according to the present invention comprises an ultraviolet-curable component and an ultraviolet polymerization initiator, wherein in cases where the sealing material further comprises a thermoplastic elastomer, its content is not higher than 5 weight % based on the total amount of the resin components, and wherein the sealing material essentially comprises the below-mentioned predefined acrylate as the aforementioned ultraviolet-curable component.

[Ultraviolet-Curable Component]:

The ultraviolet-curable component is an ultraviolet-curable compound or composition which cures due to ultraviolet irradiation. In the sealing material according to the present invention, as this ultraviolet-curable component, there is essentially contained an acrylate having a glass transition temperature of −70 to 0° C. after ultraviolet curing. As is mentioned below, it is preferable that in the sealing material according to the present invention, as an additional ultraviolet-curable component, there is further contained an acrylate having a glass transition temperature of not lower than 10° C. before ultraviolet curing.

Hereinafter, in the present application specification, for convenience, the acrylate having a glass transition temperature of −70 to 0° C. after ultraviolet curing might be expressed as "low-Tg acrylate", and the acrylate having a glass transition temperature of not lower than 10° C. before ultraviolet curing might be expressed as "high-Tg acrylate".

Hereupon, the "acrylate" in the present invention is a conception which is not limited to monoacrylates, but also include polyfunctional acrylates. Therefore, the "acrylate" in the present invention can be said to be that which contains one or more acryloyl groups per molecule. If the "acrylate" in the present invention is irradiated with ultraviolet rays, then the aforementioned acryloyl group acts as a reaction site to thus make a crosslinked structure. Therefore, as the number of the acryloyl groups becomes larger, the crosslinking becomes closer, so that the sealing material becomes more excellent in the heat resistance. However, if the number of the acryloyl groups is too large, then the softness decreases. From such a viewpoint, the number of the acryloyl groups per molecule is favorably in the range of 2 to 5.

As to the low-Tg acrylate, the use of at least one kind is enough, but the use of two or more kinds is also not hindered. Also in cases where the high-Tg acrylate is used together with the low-Tg acrylate, such cases are not limited to the use of one kind of high-Tg acrylate, but two or more kinds of high-Tg acrylates may be used together with the low-Tg acrylate. Furthermore, one kind or two or more kinds of acrylates other than the high-Tg acrylate and the low-Tg acrylate may be used together with the low-Tg acrylate.

The weight-average molecular weight of the low-Tg acrylate according to the present invention needs to be in the range of 500 to 50,000 and is preferably in the range of 500 to 30,000. In addition, also as to the acrylate such as high-Tg acrylate other than the low-Tg acrylate, the weight-average molecular weight is preferably in the range of 500 to 50,000 and is more preferably in the range of 500 to 30,000. If the molecular weight is too large, then the viscosity might become high, so that the application performance might become inferior. If the molecular weight is too small, then the viscosity might become low, so that the flowing might easily occur and, in cases where the sealing material is used for foamable sealing, the foam breakage might easily occur and a good independent-cell matter might become difficult to obtain.

The low-Tg acrylate has a glass transition temperature of −70 to 0° C. after ultraviolet curing. If the glass transition temperature after ultraviolet curing is higher than 0° C., it might be impossible to provide enough softness, so that the compression-set might be lower. If the glass transition temperature after ultraviolet curing is lower than −70° C., the viscosity might become too low, so that the flowing might occur and further, also in cases where the sealing material is used for foamable sealing, the foam breakage might easily occur and a good independent-cell matter might become difficult to obtain. The glass transition temperature after ultraviolet curing is preferably in the range of −50 to 0° C.

The low-Tg acrylate is not especially limited. However, examples thereof include: those which are obtained by introducing an acryloyl group into a molecule by utilizing isocyanate groups of an urethane prepolymer obtained by a reaction between a low-Tg polyester-polyol or polyether-polyol and an isocyanate; those which are obtained by introducing an acryloyl group into a molecule by utilizing an oxirane ring of an epoxy resin; and those which are obtained by grafting an acryloyl group onto a side chain of a copolymer of comonomers one of which is n-butyl acrylate (n-BA).

The high-Tg acrylate which is favorably used together with the low-Tg acrylate as the ultraviolet-curable components has a glass transition temperature of not lower than 10° C. before ultraviolet curing. By using the aforementioned high-Tg acrylate together with the low-Tg acrylate, the melt viscosity at 120° C. of the sealing material can be increased, so that the flowing can remarkably be prevented and also that even in cases where the sealing material is used for foamable sealing, the foam breakage can be prevented so remarkably as to easily obtain good independent cells and also the tackiness of the sealing material can be enhanced. If the aforementioned glass transition temperature is lower than 10° C., then it might become impossible to provide the aforementioned effects enough. On the other hand, if the aforementioned glass transition temperature is too high, then the viscosity might become so high as to cause problems that the application performance is degraded or that the heating temperature needed for the hot-melting becomes high. Therefore, the aforementioned glass transition temperature is favorably not higher than 100° C. and more favorably in the range of 20 to 80° C.

The high-Tg acrylate is not especially limited. However, examples thereof include: oligomers obtained by grafting an acryloyl group onto a side chain of a copolymer of comonomers one of which is methyl methacrylate (MMA); those which are obtained by introducing an acryloyl group into a side chain of a rosin ester; those which are obtained by grafting an acryloyl group by utilizing a phenolic hydroxyl group of a terpene phenol resin; and those which are obtained by introducing an acryloyl group by utilizing a residue of a non-reactive tackifier resin.

In cases where the high-Tg acrylate is used together with the low-Tg acrylate, the ratio between the low-Tg acrylate and the high-Tg acrylate depends on their respective glass transition temperatures, but is, for example, favorably in the range of 90:10 to 60:40 and more favorably in the range of 80:20 to 70:30.

The ultraviolet-curable component may include known other ultraviolet-curable compounds besides the above specific acrylates.

The above other ultraviolet-curable compounds are not especially limited. However, for example, the below-explained cationic polymerization type ultraviolet-curable compounds are favorably used.

As the cationic polymerization type ultraviolet-curable compounds, epoxidized compounds of known or commercially available various kinds of liquid polydienes can be used. Specific examples thereof include: those which are obtained by setting-in an epoxy group into such as polydiene compounds having a 1,2-polybutadiene conformation synthesized by anionic living polymerization technic or their hydrogenated products; those which are obtained by setting-in an epoxy group into polydiene compounds produced by radical polymerization; and those which are obtained by setting-in an epoxy group into molecules of liquid polydiene type oligomers by reactions between a terminal end group of the liquid polydiene type oligomers and an epoxy group of such as epoxy resins. Herein, the epoxy resins are those which have two or more epoxy groups per molecule.

Examples of commercially available products of the ultraviolet-curable compounds having an epoxy group include: trade name "R-45EPT" produced by Nagase ChemteX Corporation; trade name "PB-3600" produced by Daicel Chemical Industries, Ltd.; and trade name "L-207" produced by Craton Performance Polymers, Inc.

The weight-average molecular weight of the ultraviolet-curable compound having an epoxy group is not especially limited. However, it is in the range of 100 to 50,000, favorably 100 to 30,000, more favorably 100 to 20,000. If the molecular weight is too high, then the operation property is inferior, so that the application property of the sealing material is not good. If the molecular weight is too low, then enough softness is not obtained, so that the sealing performance is degraded.

[Ultraviolet-Curable Components as Composition]:

The ultraviolet-curable component may only comprise the aforementioned ultraviolet-curable compounds, but may be a composition obtained by taking these compounds in combination with such as epoxy resins.

Examples of the aforementioned epoxy resins include the following ones.

<Epoxy Resins>:

Those which have two or more epoxy groups per molecule are used.

Glycidyl type epoxy resins can be used. Specific examples thereof include: bisphenol A types; bisphenol F types; bisphenol S types; flame retardant types of tetrabromobisphenol A; phenol novolac types; cresol novolac types; hydrogenated bisphenol A types; and propylene oxide or ethylene oxide adducts of bisphenol A types.

Glycidyl ester type epoxy resins can be used. Specific examples thereof include: diglycidyl ester of hexahydrophthalic acid; and diglycidyl esters of dimer acids.

Glycidyl amine type epoxy resins can be used. Specific examples thereof include: triglycidyl isocyanate; and tetraglycidyldiaminodiphenylmethane.

Linear aliphatic epoxy resins can be used. Specific examples thereof include: epoxidized polybutadiene; and epoxidized soy bean oil.

Alicyclic epoxy resins can be used. Specific examples thereof include: alicyclic diepoxyacetals; alicyclic diepoxyadipates; alicyclic diepoxycarboxylates; and vinylcyclohexene oxide.

[Ultraviolet Polymerization Initiator]:

In the present invention, when the ultraviolet-curable component is cured, the ultraviolet polymerization initiator is used.

When the aforementioned acrylate as an ultraviolet-curable component is cured, a radical ultraviolet polymerization initiator is used.

As the radical ultraviolet polymerization initiator, known ones can be used adequately. However, specific examples thereof include: benzoins such as benzoin, benzoin methyl ether and benzoin ethyl ether, and their alkyl ethers; acetophenones such as acetophenone, 2,2-dimethoxy-2-phenylacetophenone, 1,1-dichloroacetophenone and 4-(1-t-butyldioxy-1-methylethyl)acetophenone; anthraquinones such as 2-methylanthraquinone, 2-amylanthraquinone, 2-t-butylanthraquinone and 1-chloroanthraquinone; thioxanthones such as 2,4-dimethylthioxanthone, 2,4-diisopropylthioxanthone and 2-chlorothioxanthone; ketals such as acetophenone dimethyl ketal and benzyl dimethyl ketal; benzophenones such as benzophenone, 4-(1-t-butyldioxy-1-methylethyl)benzophenone, and 3,3',4,4'-tetrakis(t-butyldioxycarbonyl)benzophenone; 2-methyl-1-[4-(methylthio)phenyl]-2-morpholinopropan-1-one, 2-benzyl-2-dimethylamino-1-(4-morpholinopheny)-butanone-1; acylphosphine oxides and xanthones.

Examples of commercially available products of the radical polymerization initiator include trade name "Irgacure 184" produced by Ciba-Geigy AG.

In addition, in the aforementioned case where other ultraviolet-curable compounds are also used as the ultraviolet-curable components, corresponding polymerization initiators are properly used. For example, in cases where the aforementioned cationic polymerization type ultraviolet-curable compounds are contained, cationic ultraviolet polymerization initiators are properly used.

Appropriate cationic ultraviolet polymerization initiators are properly selected and used according to the materials or composition formulations used for the cationic polymerization type ultraviolet-curable compounds.

As the cationic ultraviolet polymerization initiators, for example, onium salts can be used. The onium salts are organic salts comprising onium ions and anions and generate Lewis acids and Brønsted acids (protonic acid) by ultraviolet irradiation.

Specific examples of the onium salts include diphenyl iodonium, 4-methoxydiphenyl iodonium, bis(4-methylphenyl) iodonium, bis(4-tert-butylphenyl) iodonium, bis(dodecylphenyl) iodonium, tricummyl iodonium, triphenyl sulfonium, bis(4-(diphenylsulfonio)-phenyl) sulfide, bis(4-(di(4-(2-hydroxyethyl)phenyl)sulfonio)-phenyl) sulfide, and $\eta$5-2,4-(cyclopentadienyl)(1,2,3,4,5,6-$\eta$-(methylethyl)benzene)-iron (1+).

Specific examples of the anions include tetrafluoroborate, tetrakis(pentafluorophenyl)borate, hexafluorophosphate, hexafluoroantimonate, hexafluoroarsenate and hexachloroantimonate.

Examples of commercially available products of the cationic polymerization initiator include trade name "Adekaoptomer SP-150" produced by ADEKA Co., Ltd.

[Sensitizer]:

In order to enhance the ultraviolet curability, a sensitizer may be used. Specific examples of the sensitizer include: unsaturated ketones represented by such as chalcone derivatives and dibenzalacetone; 1,2-diketone derivatives represented by such as benzyl and camphorquinone; benzoin derivatives; fluorene derivatives; naphthoquinone derivatives; anthraquinone derivatives; xanthene derivatives; thioxanthene derivatives; xanthone derivatives; thioxanthene derivatives; coumarin derivatives; ketocoumarin derivatives; cyanine derivatives; merocyanine derivatives; polymethine dyes such as oxonol derivatives; acridine derivatives; azine derivatives; thiazine derivatives; oxazine derivatives; indoline derivatives; azulene derivatives; azulenium derivatives; squalirium derivatives; porphyrin derivatives; tetraphenylporphyrin derivatives; triarylmethane derivatives; tetrabenzoporphyrin derivatives; tetrapyrazinoporphyrazine derivatives; phthalocyanine derivatives; tetraazaporphyrazine derivatives; tetraquinoxaliroporphyrazine derivatives; naphthalocyanine derivatives; subphthalocyanine derivatives; pyrylium derivatives; thiopyrylium derivatives; tetraphyrin derivatives; annulene derivatives; spiropyran derivatives; spirooxazine derivatives; thiospiropyran derivatives; metal arene complexes; and organoruthenium complexes.

[Tackifier Resin]:

In order to adjust the hot-melting property of the sealing material, various kinds of tackifier resins which are utilized for conventional hot-melt type sealing materials can be added. However, in the sealing material according to the present invention, the tackiness can be provided to the sealing material by adding thereto the above-mentioned low-Tg acrylate, and particularly, the aforementioned tackiness also can further be enhanced by using the high-Tg acrylate together with the low-Tg acrylate. Therefore, even if the below-explained tackifier resins are not used, that will do.

Various kinds of tackifier resins which are utilized for conventional sealing materials, particularly, hot-melt type sealing materials, can be used.

Specific examples of the tackifier resins include: rosins, modified (e.g. hydrogenated) rosins, and rosin derivatives which are their esterified products; terpene type resins which are polymers of terpenes such as α-/β-pinene and dipentene; modified terpene resins such as terpene phenol resins; coumarone indene resins; and various kinds of aliphatic, alicyclic and aromatic hydrocarbon resins, and their hydrogenated resins.

[Thermoplastic Elastomer]:

Similarly to the tackifier resin, various kinds of thermoplastic elastomers which are utilized for conventional hot-melt type sealing materials can be used. However, in the sealing material according to the present invention, the hot-melting property and the softness can be provided by the low-Tg acrylate, and particularly, the aforementioned hot-melting property also can further be enhanced by using the high-Tg acrylate together with the low-Tg acrylate. Therefore, even if the below-explained thermoplastic elastomers are not used, that will do.

The aforementioned thermoplastic elastomer is not especially limited. However, for example, thermoplastic block copolymers having two or more of polystyrene blocks and one or more of elastic polymer blocks can be used. Specific examples include styrene-butadiene block copolymers (SBS) and their hydrogenated products (SEBS), and styrene-isoprene block copolymers (SIS). Thermoplastic elastomers obtained by grafting an epoxy group or carboxyl group onto the above elastomers can also be used.

[Waxes]:

Various kinds of waxes which are utilized for conventional hot-melt type sealing materials can be added.

Specific examples include the following natural waxes: paraffins comprising a major proportion of n-paraffins or iso-paraffins as contained in crude petroleum residue during petroleum purification; microcrystalline wax; montan wax produced from montanic acid which is an extract from coal; carnauba wax obtained from *Copernica cerifera* Mart; and candelilla wax obtained from grass stalks. In addition, examples of synthetic waxes include polyethylene wax produced from ethylene.

Examples of waxes preferably used of the above ones include paraffins, microcrystalline, Fischer-Tropsch, various kinds of low-molecular polyethylene waxes, some of modified waxes, and atactic polypropylene.

The natural waxes have a molecular weight of 300 to 800, so that their melting points are also low. As to the synthetic waxes, the polymerization degree can freely be changed, so that the melting point becomes higher by the difference in molecular weight. Generally, many of the synthetic waxes have a molecular weight in the range of about 1,000 to about 10,000.

[Composition Formulation and Properties of Sealing Material]:

In order to prepare the sealing material, the above-mentioned component materials are mixed together in their respective proper amounts. However, in view of the heat resistance, the ultraviolet-curable component is contained favorably in a major proportion, specifically, in a ratio of not less than 90 weight % based on the total amount of the resin components.

The low-Tg acrylate which is essentially used as an ultraviolet-curable component needs to be contained in a ratio of not less than 50 weight % based on the total amount of the resin components. If the ratio of the low-Tg acrylate is less than 50 weight %, then the low-Tg acrylate cannot sufficiently be substituted for the performances (e.g. hot-melt property, softness) of the thermoplastic elastomer.

In cases where the thermoplastic elastomer which is not ultraviolet-curable is also used, this component has a great influence on the degradation of the heat resistance, so that the amount of the thermoplastic elastomer which is not ultraviolet-curable needs to be not higher than 5 weight % based on the total amount of the resin components.

Similarly, in view of the heat resistance, in cases where the tackifier resin which is not ultraviolet-curable is also used, its amount is favorably not higher than 5 weight % based on the total amount of the resin components, and also in cases where the wax is also used, its amount is favorably not higher than 5 weight % based on the total amount of the resin components. Also as to these components, if their respective amounts are too large, then the heat resistance degradation might be caused.

The ultraviolet polymerization initiator is contained, for example, in an amount of 0.1 to 10 weight % based on the ultraviolet-curable component.

As to the properties of the hot-melt type sealing material, for example, the hot-melting temperature can be set in the range of 30 to 130° C. The melt-viscosity at 120° C. needs to be in the range of 1,000 to 50,000 mPa·s. If the melt-viscosity at 120° C. is in the aforementioned range, then the flowing does not occur, and even in cases where the sealing material is used for foamable sealing, the foam breakage does not occur, so that good independent cells can be produced. The melt-viscosity at 120° C. is favorably in the range of 1,000 to 30,000 mPa·s and more favorably in the range of 1,000 to 20,000 mPa·s. The melt-viscosity at 120° C. can easily be set in the aforementioned ranges by properly determining such as glass transition temperature or weight-average molecular weight of the acrylate and the content of the tackifier resin or thermoplastic elastomer.

[Various Kinds of Additives]:

The sealing material according to the present invention can be used further with additives added thereto according to such as purpose of the use of the sealing material, wherein the additives are, for example, as follows: dyes; organic and inorganic pigments; deoxidants or reductants such as phosphines, phosphonates and phosphites; seam inhibitors; discoloring inhibitors; halation inhibitors; fluorescent brightening agents; surfactants; colorants; fillers; plasticizers; flame retardants; antioxidants; ultraviolet absorbents; antimolds; antistatic agents; magnetic matters; and other additives for providing various properties. In addition, the sealing material also can be used with such as diluting solvents mixed therewith.

[Uses of Sealing Material]:

Basically, technics common with conventional hot-melt type sealing materials and ultraviolet-curing type sealing materials can be applied.

Usually, the sealing material is supplied to a member for providing the sealing performance or to a place needing to be sealed of apparatus and devices, for example, to a sealing surface, thereby forming a sealing matter on the sealing surface, and then the sealing matter as placed on the sealing surface contacts with a sealing surface of another member, so that the sealing performance is performed.

Specifically, an application method comprising the following steps can be adopted. Hereinafter, particularly a foaming application method for applying the sealing material in a foamed condition is explained in detail. However, in cases where the application without foaming the sealing material is desired, it is enough that in the following, the blowing-in of the inert gas is not carried out.

<Step (a): Hot-Melting and Blowing-in of Inert Gas>:

A pressurized inert gas is blown into a hot-melted sealing material. This is a step which is also applied to conventional hot-melt type sealing materials, so that the same treatment devices and conditions can be applied.

The sealing material is usually solid at normal temperature and is therefore beforehand hot-melted in order to have a liquidity. Specifically, when the sealing material is hot-melted, the heating temperature of the sealing material can be set in the range of 30 to 130° C.

In order to form a sealing foam, the pressurized inert gas is blown into the melted sealing material. As the inert gas, such as nitrogen gas or carbon dioxide can be used. The gas is favorably fed in a condition pressurized into a pressure of 0.01 to 0.1 MPa (gas cylinder pressure). If the gas cylinder pressure is too low, then it might be impossible to obtain enough foamability. If the gas cylinder pressure is too high, then it is difficult to obtain uniform independent cells.

The hot-melting of the sealing material and the blowing-in of the inert gas are usually carried out before the below-mentioned discharging of the sealing material. However, the blowing-in of the inert gas also can be carried out just before or at the same time as the discharging of the sealing material. The sealing material also can be discharged while the inert gas is blown into the sealing material. The sealing material also can be discharged by the pressurizing force due to the blowing-in of the inert gas.

This step (a) and the next step (b) may be carried out as separate steps, or there is a case where these steps are carried out as the same step or carried out simultaneously or continuously with the same apparatus.

<Step (b): Discharging and Foaming>:

The melted sealing material containing the pressurized inert gas is discharged into the air to thus foam the sealing material and simultaneously apply it to a place necessary to seal, thus making a sealing foam. This is the same operation as that for conventional hot-melt type sealing materials, so that the same treatment devices and conditions can be applied.

The discharging pressure is not especially limited. However, the discharging pressure is favorably in the range of 2.7 to 9.7 MPa. If the discharging pressure is too low, then the foam density might be low, so that the resultant foam might lack elasticity and therefore have a low sealing property, and further that occasionally, a stress more than necessary might unfavorably be applied to a place to be sealed. On the other hand, the discharging pressure is too high, then the foam breakage might be caused, so that it might be impossible to obtain any independent cell.

The melted sealing material as discharged into the air resides on a sealing surface in the form of a block having a predefined thickness or sectional shape and is solidified by cooling. On this occasion, the pressurized inert gas expands to cause a foaming phenomenon which forms fine cells or hollows in the inside of the sealing material.

The foam density of the sealing foam as obtained by foaming the sealing material is favorably set in the range of 2 to 4 densities. The foam density makes differences in respect to the softness, elasticity and sealing performance of the finally obtained sealing foam. If the foam density is too low, then enough deformability cannot be provided. If the foam density is too high, then the deformability is too much, so that enough sealing performance cannot be performed.

If the sealing material has been cool-solidified by leaving the sealing foam, then the same sealing foam as conventional hot-melt type sealing material is formed. However, in the present invention, as mentioned below, furthermore, an ultraviolet irradiation treatment is carried out.

If, while a member having a sealing surface is continuously run, the sealing material is discharged in a fixed position, then a continuous material of the discharged sealing material, that is, a sealing foam, is formed on the sealing surface. The sectional area and shape of the sealing foam being formed can be adjusted by adjusting the running speed of the sealing surface and the shape and discharging amount of the nozzle for discharging the sealing material.

<Step (c): Ultraviolet Curing>:

The sealing material as applied to the sealing surface while being foamed in the aforementioned step (b), that is, the sealing foam, is immediately irradiated with ultraviolet rays and thereby cured.

As to the discharged foaming of the sealing material and the ultraviolet irradiation thereto, there is a case where they are substantially simultaneously started. Or the ultraviolet irradiation also can be carried out after the discharging and foaming of the sealing material have been carried out enough.

To the ultraviolet irradiation, basically, there can be applied the same apparatus and treatment conditions as those for ultraviolet curing treatment to conventional ultraviolet-curable compositions.

As ultraviolet rays to be irradiated, ultraviolet rays having a wavelength of 200 to 400 nm can be irradiated at an irradiation intensity of 1 to 10,000 mW/cm$^2$.

While the sealing surface on which the sealing foam has been formed is continuously run, ultraviolet rays can be irradiated by an ultraviolet irradiation means as set with fixation. The irradiation dose per unit time and the irradiation time can be adjusted by adjusting the running speed of the sealing surface and the intensity of the ultraviolet rays.

Of course, it is also possible that an ultraviolet irradiation lamp or ultraviolet beam is moved in a condition where the sealing foam remains fixed.

[Uses of Sealing Material]:

The ultraviolet-curable hot-melt type sealing material and the foaming application method, according to the present invention, can be applied to the same uses as those of conventional hot-melt type sealing materials and ultraviolet-curable type sealing materials. Particularly, when used under severe environments such as outdoor, the sealing material according to the present invention can show excellent performance. Even under environments which cannot avoid the contact with water such as water wetting and under environments which are put in a high-temperature condition much exceeding normal temperature, the sealing material according to the present invention shows excellent sealing performance.

Specifically, examples of uses of the sealing material according to the present invention include the following:

for automobile parts, for example, housing seals for lamps such as headlamps, door modules, and interior seals;

construction materials, for example, seal parts of exterior panels constituting exterior walls, seal parts of roof materials, and lap joint parts of such as metal sizing materials; and household appliances, for example, seal places of such as refrigerators, air conditioners and washing machines.

Figure 2:
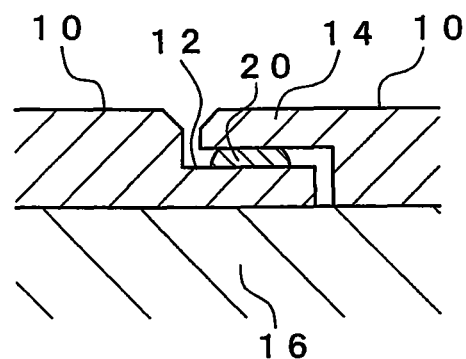
FIG. 2 is a sectional view of sealing parts in an applied condition of the construction exterior panels.

[Form of Use of Sealing Material]:

FIGS. 1 and 2 show a case where a sealing material has been applied to sealing parts of construction exterior panels to be applied onto such as exterior walls of constructions.

As is shown in FIG. 1, the construction exterior panel 10 comprising such as light-weight concrete panels has, in face-to-face side edge parts, bump-shaped notches to be joint parts for connection, and the surfaces of the bump parts are to be the sealing surfaces 12 and 14. Since the bump shapes are reverse in front and back relations at the face-to-face side edges, the sealing surface 12 and the sealing surface 14 are reverse in front and back relations. Such a connection structure in which the sealing surfaces 12 and 14 face with each other might be called lap joint.

The bead-shaped sealing foam 20 continuous along the longitudinal direction is applied onto the sealing surface 12 exposed to the front side of the construction exterior panel 10. The sealing foam 20 has an approximately semicircular sectional shape.

As is shown in FIG. 2, the construction exterior panels 10 are applied onto the construction substrate material 16 by sticking. The construction exterior panels 10 are applied from side to side in sequence. Onto the sealing surface 12 of the construction exterior panel 10, there is face-to-face placed the back-oriented sealing surface 14 of the construction exterior panel 10 being adjacently applied. The sealing surface 14 contacts with the sealing foam 20 and presses it downward. The sealing foam 20 softly deforms and thereby adheres to the sealing surface 14, so that the sealing performance is shown.

In the case of the construction exterior panels 10, they are exposed to the outdoor environment for a long time. Factors such as sunlight, difference between day warmness and night coldness, and rain give influence on the sealing foam 20 exposed to gaps between the connection parts of the construction exterior panels 10. Therefore, the sealing foam 20 is required to have such as heat resistance, water resistance and temperature change resistance to outdoor environment.

The above-mentioned application of the sealing foam 20 onto the construction exterior panels 10 also can be carried out in application fields of constructions, but it is effective that the application is beforehand carried out in such as production factories for the construction exterior panels 10.

Figure 3:
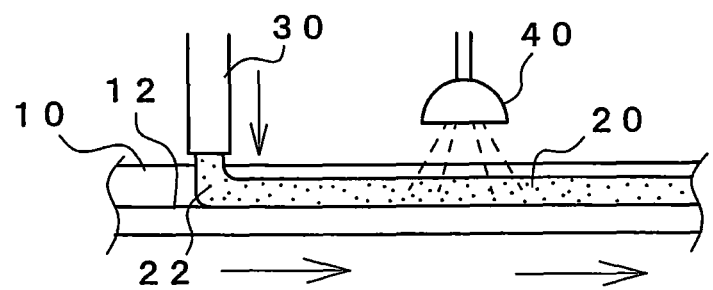
FIG. 3 is a schematic structural view illustrating a sealing treatment process.

[Application of Sealing Material]:

FIG. 3 shows a applied condition of the sealing foam 20 in such as production factories for the construction exterior panels 10.

The construction exterior panel 10 is continuously run using such as conveyor apparatus in a condition where the sealing surface 12 is set upward. Though drawing is omitted, on the upstream side of the running course, there may be set a producing step or processing step for the construction exterior panels 10. Also on the downstream side of the running course, there may be set another processing step of treating step for the construction exterior panels 10. Shown in FIG. 3 is a condition where the sealing treatment step is incorporated on the way of the production line for the construction exterior panels 10.

In the running course of the construction exterior panels 10, there is set the nozzle 30 for discharging the sealing material 22. The discharging nozzle 30 is a part of an applicator apparatus, of which the drawing has been omitted, and is connected with a reservoir tank for the sealing material 22, wherein the tank is provided to the applicator apparatus. The sealing material 22 is heated by such as heater into a melted condition in the reservoir tank or in the course of from the reservoir tank to the discharging nozzle 30. Pressurized nitrogen gas is blown into the melting-conditioned sealing material 22. Specifically, the sealing material 22 can be heated to 120° C., and thereinto, nitrogen gas can be blown at a pressure of 29 kPa.

As a specific example of such an apparatus for discharge-supplying the sealing material 22, Foam Melt Applicator FM-151 Model (trade name, produced by Nordson Corporation) can be used. In this applicator, nitrogen gas is blown into the hot-melted sealing material 22 mechanically with a particular gear pump and discharged into the air and thereby foamed.

The melted sealing material 22 as discharged onto the sealing surface 12 of the running construction exterior panel 10 results in forming a continuous bead on the sealing surface 12. For example, the running speed of the sealing surface 12 can be set for 15 m/min.

When discharged from the discharging nozzle 30, the sealing material 22 being put under normal pressure is foamed by expansion of the pressurized nitrogen gas, so that independent cells are formed in the inside of the sealing material 22. In addition, since the heated sealing material 22 rapidly cools and solidifies, the aforementioned bead shape remains kept, so that the sealing material 22 does not extend over a wide range of the sealing surface 12 in the form of a liquid. The foaming phenomenon can promote the cooling and thereby can rapidly solidify the sealing material 22 in a proper bead shape.

Just on the downstream side of the discharging nozzle 30 in the mining course of the construction exterior panels 10, there is placed the ultraviolet irradiation lamp 40. The ultraviolet irradiation lamp 40 is irradiated to the sealing foam 20 formed from the sealing material 22. The ultraviolet curing occurs in the inside of the sealing foam 20. The conditions of the ultraviolet irradiation, for example, can be set so that ultraviolet rays having a wavelength of 200 to 400 nm are irradiated at an irradiation intensity of 2,000 mW/cm$^2$ to expose each part of the running sealing foam 20 to the ultraviolet rays for 30 seconds.

As a specific example of such an ultraviolet irradiation system, trade name "Light Hammer 6" produced by Fusion UV Systems, Japan, K.K. can be used.

Since the sealing material 22 contains the ultraviolet-curable component and the ultraviolet polymerization initiator, the curing rapidly proceeds due to the ultraviolet irradiation. Each part of the sealing material 22 only passes the irradiation region of the ultraviolet irradiation lamp 40 in a short time, but sufficiently undergoes the action of the ultraviolet rays, so that the ultraviolet curing is rapidly started, and further that the ultraviolet curing rapidly proceeds from the surface to inside of the sealing foam 20 and, as a result, the ultraviolet curing rapidly proceeds throughout the entirety of the sealing foam 20 having some degree of thickness.

The construction exterior panels 10 having passed the position of the ultraviolet irradiation lamp 30 also can be fed out to the next treatment step or subjected to a shipping or safekeeping work. The sealing foam 20 on the sealing surface 12 has enough shape retainability, and its surface does not have strong stickiness, and even if the surface is subject to the touch or to the contact with another object, the shape is not deformed, or damage is not done.

WORKING EXAMPLES

Hereinafter, the present invention is more specifically illustrated by the following Examples of some preferred embodiments in comparison with Comparative Examples not according to the present invention. However, the present invention is not limited to these examples.

Examples 1 to 7, Comparative Examples 1 to 3

The ultraviolet-curable component and the ultraviolet polymerization initiator and further, optionally, the thermoplastic elastomer and the tackifier resin according to the composition formulations as shown in Table 1 below were stirred and mix-kneaded together to thereby prepare sealing materials of Examples 1 to 7 and Comparative Examples 1 to 3, and these sealing materials were measured for the melt-viscosity at 120° C. The results are shown in Table 1. Incidentally, the numerical values as to the formulations in Table 1 represent weight parts.

TABLE 1

|  |  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Ultraviolet-curable component | High-Tg acrylate A |  |  | 25 | 40 | 10 | 5 |  |  |  |  |
|  | High-Tg acrylate B | 25 | 40 |  |  |  |  |  |  |  |  |
|  | Low-Tg acrylate C | 50 | 50 | 50 | 50 | 55 | 50 |  | 70 | 75 | 50 |
|  | Low-Tg acrylate D | 25 | 10 | 25 | 10 | 25 | 20 |  |  | 25 | 25 |
|  | Low-Tg acrylate E |  |  |  |  |  |  | 100 |  |  |  |
|  | Cationic-polymerizable compound F |  |  |  |  |  | 10 |  |  |  |  |
|  | Cationic-polymerizable compound G |  |  |  |  |  | 10 |  |  |  |  |
| Ultraviolet polymerization initiator | Radical polymerization initiator | 3 | 3 | 3 | 3 | 3 | 3 | 3 | 3 | 3 | 3 |
|  | Cationic polymerization initiator |  |  |  |  |  | 1 |  |  |  |  |
| Tackifier resin |  |  |  |  |  | 5 |  |  | 20 |  |  |
| Thermoplastic elastomer |  |  |  |  |  | 5 |  |  | 10 |  |  |
| Melt-viscosity | mPa·s/120° C. | 5000 | 6000 | 8800 | 10000 | 6000 | 6000 | 1200 | 4000 | 800 | 900 |

High-Tg acrylate A: IBA-100 (produced by Soken Chemical & Engineering Co., Ltd.; Mw: 10,000, Tg before ultraviolet curing: 20° C.)
High-Tg acrylate B: Beamset 101 (produced by Arakawa Chemical Industries, Ltd.; Mw: 430, Tg before ultraviolet curing: 18° C.)
Low-Tg acrylate C: Shikoh-UV-3000B (produced by Nippon Synthetic Chemical Industry Co., Ltd.; Mw: 18,000, Tg after ultraviolet curing: −52° C.)
Low-Tg acrylate D: Shikoh-UV-3700B (produced by Nippon Synthetic Chemical Industry Co., Ltd.; Mw: 38,000, Tg after ultraviolet curing: −59° C.)
Low-Tg acrylate E: Shikoh-UV-2000B (produced by Nippon Synthetic Chemical Industry Co., Ltd.; Mw: 13,000, Tg after ultraviolet curing: −40° C.)
Cationic-polymerizable compound F: Epicoat 828 (produced by Japan Epoxy Resin Co., Ltd., Mw: 380)
Cationic-polymerizable compound G: PB-3600 (produced by Daicel Chemical Industries, Ltd.)
Radical polymerization initiator: Irgacure 184 (produced by Ciba Speciality Chemicals Co., Ltd., 1-hydroxycyclohexyl phenyl ketone)
Cationic polymerization initiator: Cyracure CPI-6992 (The Dow Chemical Company: sulfonium salt)
Tackifier resin: terpene phenol type resin, softening point: 120° C.
Thermoplastic elastomer: Vylon GA-6400 (produced by Toyobo Co., Ltd.: saturated polyester resin)

The melt-viscosity as shown in Table 1 was measured under the following conditions.

<Melt-Viscosity>:

The sealing materials of Examples 1 to 7 and Comparative Examples 1 to 3 were measured for the melt-viscosity (mPa·s) at 120° C. with a Brookfield type Themosel System viscometer, #27 spindle by a conventional method.

Next, the foam density, the flowing, the UV reactivity, the heat-resistant blocking, the compression-set, the hardness, the water tightness and the foamability were evaluated.

In these evaluations, first of all, as condition 1, each of the above sealing materials of Examples 1 to 7 and Comparative Examples 1 to 3 was hot-melted, foamed and discharged under the following condition, and then each evaluation was carried out. The results are shown in Table 2.

(Condition 1):

Each of the above sealing materials of Examples 1 to 7 and Comparative Examples 1 to 3 was hot-melted at a temperature of 120° C. with Foam Melt Applicator (trade name "FM-151", produced by Nordson Corporation), and then nitrogen gas was mixed into the melting-conditioned sealing material at a gas cylinder pressure of 0.05 MPa, and then the melting-conditioned sealing material containing the pressurized nitrogen gas was discharged into the air at a discharging pressure of 5.0 MPa and thereby foamed.

TABLE 2

(Condition 1)

| | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Ultraviolet-curable component | High-Tg acrylate A | | | 25 | 40 | 10 | 5 | | | | |
| | High-Tg acrylate B | 25 | 40 | | | | | | | | |
| | Low-Tg acrylate C | 50 | 50 | 50 | 50 | 55 | 50 | | 70 | 75 | 50 |
| | Low-Tg acrylate D | 25 | 10 | 25 | 10 | 25 | 20 | | | 25 | 25 |
| | Low-Tg acrylate E | | | | | | | 100 | | | |
| | Cationic-polymerizable compound F | | | | | | 10 | | | | |
| | Cationic-polymerizable compound G | | | | | | 10 | | | | |
| Ultraviolet polymerization initiator | Radical polymerization initiator | 3 | 3 | 3 | 3 | 3 | 3 | 3 | 3 | 3 | 3 |
| | Cationic polymerization initiator | | | | | | 1 | | | | |
| Tackifier resin | | | | | | | 5 | | 20 | | |
| Thermoplastic elastomer | | | | | | | 5 | | 10 | | |
| Foam density | densities | 3 | 3 | 3 | 3 | 3 | 3 | 3 | 3 | 3 | 3 |
| Flowing | | ○ | ○ | ○ | ○ | ○ | ○ | ○ | ○ | X | X |
| UV reactivity Irradiation intensity: 2000 mW/cm² Irradiation time: 30 seconds | Sticky or not | No | No | No | No | No | No | No | Yes | No | No |
| Heat-resistant blocking | 100° C./after 5 days | ○ | ○ | ○ | ○ | ○ | ○ | ○ | X | ○ | ○ |
| Compression-set | 80° C. × 24 hours (50% compression) and thereafter releasing at 23° C. | ○ | ○ | ○ | ○ | ○ | ○ | ○ | ○ | ○ | ○ |
| Hardness | 23° C. (Shore 00) | 45 | 45 | 45 | 46 | 48 | 50 | 55 | 22 | 45 | 45 |
| Water tightness | 23° C. × 24 hours (during 50% compression) | ○ | ○ | ○ | ○ | ○ | ○ | ○ | ○ | X | X |
| Foamability | Continuous or independent | ○ | ○ | ○ | ○ | ○ | ○ | ○ | ○ | X | X |

High-Tg acrylate A: IBA-100 (produced by Soken Chemical & Engineering Co., Ltd.; Mw: 10,000, Tg before ultraviolet curing: 20° C.)
High-Tg acrylate B: Beamset 101 (produced by Arakawa Chemical Industries, Ltd.; Mw: 430, Tg before ultraviolet curing: 18° C.)
Low-Tg acrylate C: Shikoh-UV-3000B (produced by Nippon Synthetic Chemical Industry Co., Ltd.; Mw: 18,000, Tg after ultraviolet curing: −52° C.)
Low-Tg acrylate D: Shikoh-UV-3700B (produced by Nippon Synthetic Chemical Industry Co., Ltd.; Mw: 38,000, Tg after ultraviolet curing: −59° C.)
Low-Tg acrylate E: Shikoh-UV-2000B (produced by Nippon Synthetic Chemical Industry Co., Ltd.; Mw: 13,000, Tg after ultraviolet curing: −40° C.)
Cationic-polymerizable compound F: Epicoat 828 (produced by Japan Epoxy Resin Co., Ltd., Mw: 380)
Cationic-polymerizable compound G: PB-3600 (produced by Daicel Chemical Industries, Ltd.)
Radical polymerization initiator: Irgacure 184 (produced by Ciba Speciality Chemicals Co., Ltd., 1-hydroxycyclohexyl phenyl ketone)
Cationic polymerization initiator: Cyracure CPI-6992 (The Dow Chemical Company: sulfonium salt)
Tackifier resin: terpene phenol type resin, softening point: 120° C.
Thermoplastic elastomer: Vylon GA-6400 (produced by Toyobo Co., Ltd.: saturated polyester resin)

Next, as condition 2, each of the above sealing materials of Examples 1 to 7 was hot-melted, foamed and discharged under the following condition, and then each evaluation was carried out. The results are shown in Table 3.

(Condition 2):

Each of the above sealing materials of Examples 1 to 7 was hot-melted at a temperature of 120° C. with Foam Melt Applicator (trade name "FM-151", produced by Nordson Corporation), and then nitrogen gas was mixed into the melting-conditioned sealing material at a gas cylinder pressure of 0.005 MPa, and then the melting-conditioned sealing material containing the pressurized nitrogen gas was discharged into the air at a discharging pressure of 2.0 MPa and thereby foamed.

TABLE 3

| | | (Condition 2) | | | | | | |
|---|---|---|---|---|---|---|---|---|
| | | Example 1 | Example 2 | Example 3 | Example 4 | Example 5 | Example 6 | Example 7 |
| Ultraviolet-curable component | High-Tg acrylate A | | | 25 | 40 | 10 | 5 | |
| | High-Tg acrylate B | 25 | 40 | | | | | |
| | Low-Tg acrylate C | 50 | 50 | 50 | 50 | 55 | 50 | |
| | Low-Tg acrylate D | 25 | 10 | 25 | 10 | 25 | 20 | |
| | Low-Tg acrylate E | | | | | | | 100 |
| | Cationic-polymerizable compound F | | | | | | 10 | |
| | Cationic-polymerizable compound G | | | | | | 10 | |
| Ultraviolet polymerization initiator | Radical polymerization initiator | 3 | 3 | 3 | 3 | 3 | 3 | 3 |
| | Cationic polymerization initiator | | | | | | 1 | |
| Tackifier resin | | | | | | | 5 | |
| Thermoplastic elastomer | | | | | | | 5 | |
| Foam density | densities | 3 | 3 | 3 | 3 | 3 | 3 | 3 |
| Flowing | | ○ | ○ | ○ | ○ | ○ | ○ | ○ |
| Irradiation intensity: 2000 mW/cm² Irradiation time: 30 seconds | Sticky or not | No | No | No | No | No | No | No |
| Heat-resistant blocking | 100° C./after 5 days | Δ | Δ | Δ | Δ | Δ | Δ | Δ |
| Compression-set | 80° C. × 24 hours (50% compression) and thereafter releasing, at 23° C. | ○ | ○ | ○ | ○ | ○ | ○ | ○ |
| Hardness | 23° C. (Shore 00) | 45 | 45 | 45 | 46 | 48 | 50 | 55 |
| Water tightness | 23° C. × 24 hours (during 50% compression) | Δ | Δ | Δ | Δ | Δ | Δ | Δ |
| Foamability | Continuous or independent | Δ | Δ | Δ | Δ | Δ | Δ | Δ |

High-Tg acrylate A: IBA-100 (produced by Soken Chemical & Engineering Co., Ltd.; Mw: 10,000, Tg before ultraviolet curing: 20° C.)
High-Tg acrylate B: Beamset 101 (produced by Arakawa Chemical Industries, Ltd.; Mw: 430, Tg before ultraviolet curing: 18° C.)
Low-Tg acrylate C: Shikoh-UV-3000B (produced by Nippon Synthetic Chemical Industry Co., Ltd.; Mw: 18,000, Tg after ultraviolet curing: −52° C.)
Low-Tg acrylate D: Shikoh-UV-3700B (produced by Nippon Synthetic Chemical Industry Co., Ltd.; Mw: 38,000, Tg after ultraviolet curing: −59° C.)
Low-Tg acrylate E: Shikoh-UV-2000B (produced by Nippon Synthetic Chemical Industry Co., Ltd.; Mw: 13,000, Tg after ultraviolet curing: −40%)
Cationic-polymerizable compound F: Epicoat 828 (produced by Japan Epoxy Resin Co., Ltd., Mw: 380)
Cationic-polymerizable compound G: PB-3600 (produced by Daicel Chemical Industries, Ltd.)
Radical polymerization initiator: Irgacure 184 (produced by Ciba Speciality Chemicals Co., Ltd., 1-hydroxycyclohexyl phenyl ketone)
Cationic polymerization initiator: Cyracure CPI-6992 (The Dow Chemical Company: sulfonium salt)
Tackifier resin: terpene phenol type resin, softening point: 120° C.
Thermoplastic elastomer: Vylon GA-6400 (produced by Toyobo Co., Ltd.: saturated polyester resin)

In the above Tables 2 and 3, the evaluations of the foam density, the flowing, the UV reactivity, the heat-resistant blocking, the compression-set, the hardness, the water tightness and the foamability are specifically as follows.

<Foam Density>:

While being foamed under each condition above, the sealing material was applied onto mold-releasing paper into the shape of a bead of about 2 cm in width and about 15 cm in length, thus preparing a test piece.

After the test piece had cooled and solidified, its mass was measured. The test piece was immersed into a measuring cylinder of 250 ml containing 200 ml of water to measure the volume of the test piece. Assuming that the specific gravity of the test piece was 1.0, the foam density was calculated by the following equation.

Foam density=volume of test piece/mass of test piece

Incidentally, in the case of the two-package type sealing material, the above test was carried out after the foaming-curing.

<Flowing>:

While being foamed under each condition above, the sealing material was applied onto the surface of a stainless steel sheet "SUS-304" as defined in JIS G4305 at a foam density of 3 so as to be 5 mm in bead width and 4 mm in height, thus obtaining a sealing foam.

Thereafter, the sealing foam was left under 23° C./50 to 60 RH for 5 minutes, and thereafter the bead width was measured to make evaluation by the following marking.

mark "○": the width of 5 mm is maintained.
mark "X": the bead width has exceeded 5 mm.

<UV Reactivity>:

While being foamed under each condition above, the sealing material was applied onto the surface of a stainless steel sheet "SUS-304" at a foam density of 3 so as to be 3 mm in bead width and 4 mm in height, thus obtaining a sealing foam.

The aforementioned sealing foam was subjected to UV curing at an irradiation intensity of 2,000 mW/cm² for an irradiation time of 30 seconds. Thereafter, the cured sealing foam was left under an atmosphere of 120° C. to evaluate the surface stickiness by the following marking.

mark "○": the stickiness of the surface is not recognized.
mark "X": the stickiness of the surface is recognized.

<Heat-Resistant Blocking>:

The ultraviolet-cured sealing foam as obtained under the same conditions as those for the above UV reactivity test was compressed to a position of 2 mm (50% compression) with a stainless steel sheet "SUS-304" and fixed with a clip. This was left in a hot-air-circulating oven of 100° C. for 5 days, and then the condition of the adhesion to the "SUS-304" was checked to make evaluation by the following marking.

mark "○": the adhesion to the "SUS-304" is not recognized.

mark "Δ": there is not complete adhesion to the "SUS-304", but adhesion print is recognized.

mark "X": the adhesion to the "SUS-304" is recognized.

<Compression-Set>:

The ultraviolet-cured sealing foam as obtained under the same conditions as those for the above UV reactivity test was compressed to a position of 2 mm (50% compression) with a stainless steel sheet "SUS-304" and fixed with a clip. While this 50% compressed condition was kept, the foam was left under a temperature of 80° C. for 24 hours. Thereafter, the compression was released under 23° C./50 to 60% RH. After the foam had been left under 23° C./50 to 60% RH for 24 hours, the thickness of the test foam of which the compression had been removed was measured. The compression-set ratio was calculated by the following equation and evaluated by the following marking.

Compression-set ratio=$(a1/a0) \times 100$ a0: Thickness (mm) of test foam before test
a1: Thickness (mm) of test foam after test
Mark "○": the compression-set ratio is not less than 80%.
Mark "X": the compression-set ratio is less than 80%.
<Hardness>:

The ultraviolet-cured sealing foam as obtained under the same conditions as those for the above UV reactivity test was measured for the Shore hardness 00 with "GS-754G" produced by Teclock Co., Ltd. The larger numerical value means the more hardness.

<Water Tightness>:

The ultraviolet-cured sealing foam as obtained under the same conditions as those for the above UV reactivity test was compressed to a position of 2 mm (50% compression) with a stainless steel sheet "SUS-304" and deformed into the U-shape in this condition. Water was added to a measuring line. The foam was left under 23° C./50 to 60% RH for 24 hours to check whether water bled out of the convex part of the U-shape, and it was evaluated by the following marking.

mark "○": there is no water bleeding.
mark "Δ": water bleeding was seen a little.
mark "X": water bleeding was seen.
<Foamability>:

The ultraviolet-cured sealing foam as obtained under the same conditions as those for the above UV reactivity test was checked as to its foamed condition with a video microscope by the following marking.

mark "○": independent cells are formed in the inside of the foam.

mark "Δ": independent cells and continuous cells coexist in the inside of the foam.

mark "X": no independent cell is seen in the inside of the foam, but continuous cells are formed.

[Synthetic Evaluation of Performance]:

From the results as shown in Tables 1 and 2, it is understood that the sealing materials of Examples 1 to 7 have excellent heat resistance, excellent compression-set, high softness (Shore hardness of about 45 to about 50), and high water tightness, and further a foamed condition where independent cells are formed.

On the other hand, as to the sealing material of Comparative Example 1, since the mixing amount of the thermoplastic elastomer which is not ultraviolet-curable exceeds 5 weight % based on the total amount of the resin components, the heat resistance is low.

As to the sealing materials of Comparative Examples 2 and 3, since they do not contain any thermoplastic elastomer which is not ultraviolet-curable, they have enough heat resistance. However, they have too low melt-viscosity at 120° C. to sufficiently prevent the flowing and also have low water lightness and further fail to ensure independent cells.

The results as shown in Table 3 are results of evaluations under conditions deviating from the favorable conditions such as gas cylinder pressure of 0.01 to 0.1 MPa and discharging pressure of 2.7 to 9.7 MPa. Therefore, when compared with the results as shown in Table 2 satisfying the aforementioned favorable conditions, even if the sealing materials are the same, the evaluation of the foamability is a little degraded, and accompanying this, the evaluations of the heat resistance and the water tightness are also a little degraded. However, the aforementioned gas cylinder pressure and discharging pressure are no other than favorable conditions for applying the sealing material, and when compared with the results as shown as to Comparative Examples 1 to 3 in Table 2, the superiority is high.

INDUSTRIAL APPLICATION

The sealing material and the method of foaming application thereof, according to the present invention, for example, can favorably used as a sealing material and method of foaming application thereof for such as household appliance parts, automobile interior and exterior parts, and automobile door modules, and for between metal sheets.

The invention claimed is:

1. A method of foaming and applying a sealing material, which comprises the steps of:
   hot-melting the sealing material;
   mixing a pressurized inert gas into the melted sealing material;
   discharging the melted sealing material containing the pressurized inert gas into the air to thus foam the sealing material and simultaneously apply it to a place necessary to seal, thus making a sealing foam; and
   irradiating this sealing foam with ultraviolet rays, thus curing the sealing material;
   wherein the mixing of the inert gas is carried out by: using nitrogen gas as the inert gas; pressurizing the nitrogen gas into a pressure of 0.01 to 0.1 MPa; and blowing the pressurized nitrogen gas into the sealing material; and
   the applying of the sealing material is carried out at a discharging pressure of 2.7 to 9.7 MPa; and
   wherein the sealing material comprises an ultraviolet-curable component and an ultraviolet polymerization initiator, wherein in cases where the sealing material further comprises a thermoplastic elastomer which is not ultraviolet-curable, its content is not higher than 5 weight % based on the total amount of resin components, and wherein the sealing material comprises an acrylate as the ultraviolet-curable component in a ratio of not less than 50 weight % based on the total amount of the resin components wherein the acrylate has a weight-average molecular weight of 500 to 50,000 and has a glass transition temperature of −70 to 0° C. after ultraviolet curing, and wherein the sealing material has a melt-viscosity at 120° C. of 1,000 to 50,000 mPa·s.

2. The method according to claim 1, which the sealing material further comprises an acrylate having a glass transition temperature of not lower than 10° C. before ultraviolet curing as another ultraviolet-curable component.

3. The method according to claim 1, wherein the sealing foam has a foam density of 2 to 5.

4. The method according to claim 2, wherein the sealing foam has a foam density of 2 to 5.

* * * * *